(No Model.)

S. A. HAINES.
ANT TRAP.

No. 360,293. Patented Mar. 29, 1887.

Witnesses:
George E. Frech
[signature]

Inventor:
Samuel A. Haines
by Louis Bagger & Co.
his Attorneys.

UNITED STATES PATENT OFFICE.

SAMUEL ALFRED HAINES, OF GUIDE, TEXAS.

ANT-TRAP.

SPECIFICATION forming part of Letters Patent No. 360,293, dated March 29, 1887.

Application filed January 25, 1887. Serial No. 225,476. (No model.)

*To all whom it may concern:*

Be it known that I, SAMUEL ALFRED HAINES, a citizen of the United States, and a resident of Guide, in the county of Ellis and State of Texas, have invented certain new and useful Improvements in Ant-Traps; and I do hereby declare that the following is a full, clear, and exact description of the invention, which will enable others skilled in the art to which it appertains to make and use the same, reference being had to the accompanying drawings, which form a part of this specification, and in which—

Figure 1:
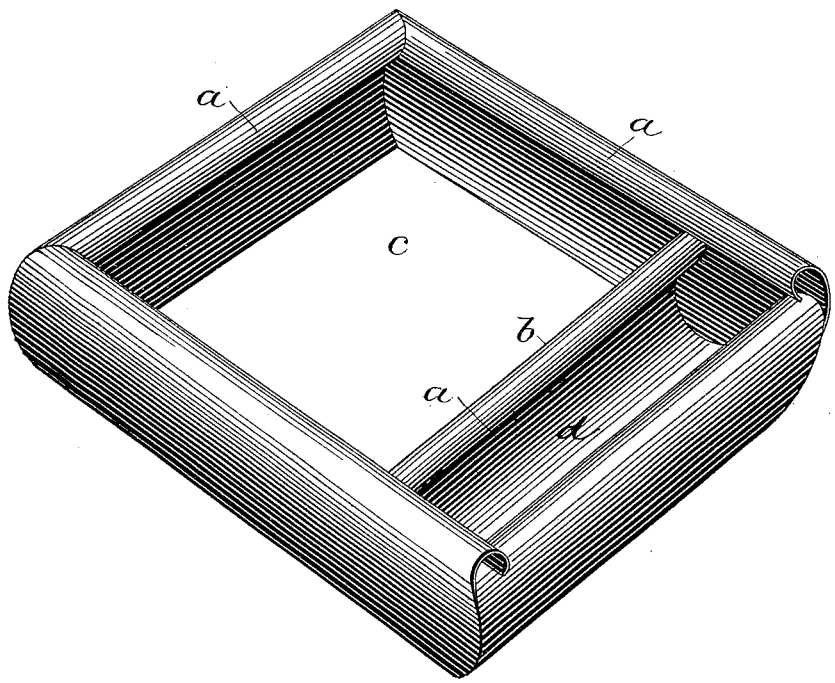
Figure 2:
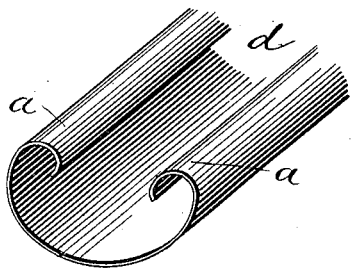

Figure 1 is a perspective view of my improved ant-trap, and Fig. 2 is a perspective detail view of a part or portion of the same.

Like letters of reference indicate corresponding parts in both the figures.

My invention has relation to devices for catching ants, and more particularly the small red ants which infest certain localities of the Southern States; and it consists in the improved trap or device adapted for such a purpose, which will be hereinafter more fully described and claimed.

My improved trap, which may be of any suitable kind of sheet metal, is constructed in the shape of a square or rectangular frame, as shown in Fig. 1—say about ten inches square and three inches deep, more or less. In one end of this open frame is arranged the box $d$, consisting of a piece of sheet metal bent into the shape shown more clearly in Fig. 2, so as to form a trough or gutter with a rounded bottom and overturned edges $a$ $a$. This trough forms one side of the rectangular frame, the three remaining sides of said frame being constructed of strips of sheet metal, the upper edges of which are turned inwardly to form convex beads $a$ in like manner as the overturned edges $a$ of the trough $d$.

The middle part of the device is left open, as shown at $c$, and the trap is used in the following manner: The frame is placed over the hole in which the ants live, or the so-called "ant-hill," and loose earth is built up around the four sides, on the outside, up to the top of the overturned edges $a$. On the inside of the trap earth is built up against the side marked $b$ in the same manner, so as to form an inclined way leading from the ant-hill up to the upper edge of the trough. As the ants emerge from the hole they find themselves inclosed on three sides by the three sides of the frame, the overlapping or concave edges of which prevent them from escaping, and their only means of egress is by the inclined way leading to the inner edge of the trough $d$. As they ascend this hill they fall into the bottom of the trough $d$, from which they cannot escape, and from which they can easily be collected and destroyed. In like manner ants outside of the ant-hill proper are likely to ascend the inclined sides leading to the inside of the trap, and to drop down into the open middle part of the same, from which they have no means of egress, except by the incline leading to the trough $d$, in which they are then caught. As a rule, the earth around the ant-hill is very loose, and the trap can be pressed down nearly on a level with the earth, so that but little earth, if any, need be built up around it. When the ants are out, they are continuously running around and will invariably drop into the box or into the open space marked $c$.

From the foregoing it will be seen that this device can be manufactured at a nominal cost, is not liable to get out of order, and can be readily applied and used by any person of ordinary intelligence.

Having thus described my invention, I claim and desire to secure by Letters Patent of the United States—

In a device for catching ants, the combination, with an open frame, $a$, of the end piece or trough, $d$, having a concave bottom and overturned edges, substantially as and for the purpose set forth.

In testimony that I claim the foregoing as my own I have hereunto affixed my signature in presence of two witnesses.

SAMUEL ALFRED HAINES.

Witnesses:
   W. H. FREARS,
   D. DESDEN.